US012613573B2

(12) United States Patent
Zhang et al.

(10) Patent No.: US 12,613,573 B2
(45) Date of Patent: Apr. 28, 2026

(54) DETERMINING BODY POSE FROM ENVIRONMENTAL DATA

(71) Applicant: Samsung Electronics Co., Ltd., Suwon-si (KR)

(72) Inventors: Shijia Zhang, University Park, PA (US); Wenjun Jiang, San Jose, CA (US); Xun Chen, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/819,197

(22) Filed: Aug. 29, 2024

(65) Prior Publication Data

US 2025/0165060 A1 May 22, 2025

Related U.S. Application Data

(60) Provisional application No. 63/600,150, filed on Nov. 17, 2023.

(51) Int. Cl.
G06F 3/01 (2006.01)
G02B 27/00 (2006.01)
(Continued)

(52) U.S. Cl.
CPC ......... G06F 3/012 (2013.01); G02B 27/0093 (2013.01); G02B 27/0172 (2013.01); G06T 19/006 (2013.01)

(58) Field of Classification Search
CPC . G02B 27/0093; G02B 27/0172; G06F 3/012; G06F 3/011; G06F 3/013; G06F 3/017;

G06F 3/04815; G06F 3/1446; G06F 8/34; G06F 8/36; G06F 9/451; G06T 19/006; G09G 2320/0613; G09G 2354/00; G09G 2370/12; G09G 2370/20
See application file for complete search history.

(56) References Cited

U.S. PATENT DOCUMENTS 11,809,617 B2 11/2023 Johnson
11,868,546 B2 1/2024 Bosworth
(Continued)

FOREIGN PATENT DOCUMENTS

CN 116434326 A 7/2023
JP 2019-121045 A 7/2019
JP 2022-007839 A 1/2022

OTHER PUBLICATIONS

International Search Report in International Application No. PCT/KR2024/018061, Feb. 24, 2025.

*Primary Examiner* — Nelson M Rosario

(57) ABSTRACT

In one embodiment, a method includes accessing video captured by one or more cameras of a head-mounted device (HMD) worn by a user and determining, from the accessed video, multiple environmental feature maps and multiple corresponding environmental embeddings representing an environment of the user captured in the accessed video. The method further includes fusing, by multiple trained environmental transformer models, the environmental embeddings to create a fused environmental embedding; determining a head pose of the user coincident with the accessed video; and predicting, by a trained decoder and based on the fused environmental embedding and the determined head pose of the user, a body pose of the user.

20 Claims, 3 Drawing Sheets

(51) Int. Cl.
G02B 27/01 (2006.01)
G06T 19/00 (2011.01)

(56) References Cited

U.S. PATENT DOCUMENTS

| 12,276,795 | B2 | 4/2025 | Wang | |
| 2018/0070864 | A1 | 3/2018 | Schuster | |
| 2018/0262684 | A1 | 9/2018 | Lowry | |
| 2019/0139321 | A1* | 5/2019 | Kocharlakota | G06F 3/011 |
| 2020/0218342 | A1* | 7/2020 | Murali | G02B 27/0093 |
| 2022/0083125 | A1 | 3/2022 | Lefaudeux | |
| 2022/0319041 | A1 | 10/2022 | Jiang | |
| 2023/0064242 | A1 | 3/2023 | Kim | |
| 2023/0133574 | A1 | 5/2023 | Kim | |
| 2024/0046516 | A1 | 2/2024 | Anciukevicius | |
| 2024/0329795 | A1* | 10/2024 | Dehkordi | G06F 3/011 |

* cited by examiner

DETERMINING BODY POSE FROM ENVIRONMENTAL DATA

PRIORITY CLAIM

This application claims the benefit under 35 U.S.C. § 119 of U.S. Provisional Patent Application No. 63/600,150 filed Nov. 17, 2023, which is incorporated by reference herein.

TECHNICAL FIELD

This application generally relates to determining a user's body pose from environmental data.

BACKGROUND

An extended reality (XR) system can include displaying computer-generated content combined with a real-world scene, for example as in augmented reality (AR) or mixed reality (MR), or can include display of only computer-generated content, such as in virtual reality (VR). The display is often three dimensional. An XR system can include, for example, a head-mounted display (HMD), such as a headset, or a pair of glasses, etc., that includes one or more displays for displaying XR content. XR content can include virtual objects or content from one or more applications, such as a web browser, a productivity application, a gaming application, etc., and this content may be displayed along with portions of a user's physical environment, i.e., the real-world environment in the vicinity of the user.

XR has many personal and professional uses, including gaming, entertainment, healthcare, education, automotive, and architecture. For example, medical professionals may use VR for surgical training, educators may use AR for immersive learning experience, and automotive companies may employ VR for design and prototyping.

DESCRIPTION OF EXAMPLE EMBODIMENTS

In many XR applications it is useful to capture a user's full-body posture, for example to determine the user's pose while interacting with objects, the environment, or other users. Full-body posture identifies more than just the posture of the user's head and hands, and instead identifies the posture of additional body parts (e.g., trunk, arms, legs) or of the body in general (e.g., of most or substantially all of the user's skeleton).

Understanding the user's full-body posture within a virtual space can amplify the sense of presence and realism, for example because human communication and interaction involves a range of body gestures, natural posture shifts, and intuitive movements beyond head and hand movements. Despite the valuable insights a person's full-body posture provides, a user's body posture is often not directly accessible by an XR device. For example, due to the blind spots of egocentric cameras in XR headsets, the user's body pose remains largely concealed from direct visual observation. Some techniques require multiple cameras that collectively capture different parts of the user's body. However, most XR devices include only one or two cameras capturing egocentric video, and this captured video often contains only the environment surrounding the user (and, at times, the user's hands).

Figure 1:
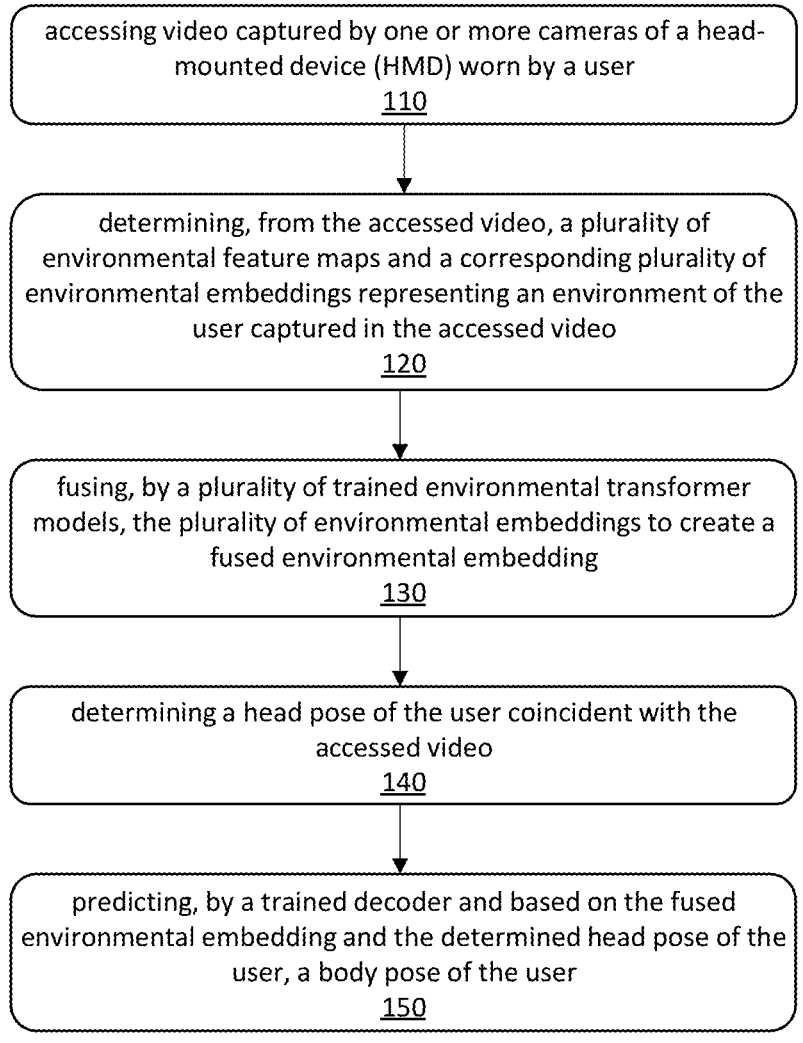
FIG. 1 illustrates an example method for estimating the body pose of a user.

In contrast, the techniques of this disclosure estimate a user's body pose from egocentric video of the user's XR device. As explained herein, these techniques do not require video of a user's body parts to estimate a pose of that user; instead, the users' body pose is estimated from video of the environment of the user as captured by the XR device. FIG. 1 illustrates an example method for estimating the body pose of a user. As explained herein, in particular embodiments the method of FIG. 1 may be performed in real time, so that a user's body pose is estimated in real time as video of the user's environment is obtained. In particular embodiments, the method of FIG. 1 may be performed continuously (i.e., on essentially every frame of the video) or may be performed periodically (e.g., on a sequence if images every 5 seconds, every 30 seconds, etc.) to update an estimate of the user's body pose. In particular embodiments, the method of FIG. 1 may be performed as needed, e.g., when predicting the user's body pose is relevant to the user's experience. In particular embodiments, the steps of the method of FIG. 1 may be performed by an XR device, may be performed by another device (e.g., by a server device or a local computing device that accesses video captured by the XR device), or by a combination of computing devices.

Step 110 of the example method of FIG. 1 includes accessing video captured by one or more cameras of a head-mounted device (HMD) worn by a user. The accessed video contains a sequence of images captured by the camera(s) of the HMD device. The video may be 2D video or may be 3D video (e.g., a pair of stereoscopic images for 3D image). In the example of FIG. 1 in XR device is am HMD, but the techniques described herein may generally be used with video captured by other user-worn devices or by video of a user's environment captured by other cameras. The environment captured by the video referred to in step 110 may be a real environment captured by one or more real cameras, may be a virtual environment captured by one or more virtual cameras, or may be a combination thereof. However, in each instance the user's body pose is the real body pose of the user, i.e., the actual body pose of the user in real life.

Step 120 of the example method of FIG. 1 includes determining, from the accessed video, multiple environmental feature maps and multiple corresponding environmental embeddings representing an environment of the user as captured in the accessed video. As explained in more detail below, the techniques described herein generate environmental embeddings related to a user pose from feature maps generated from the egocentric video. These environmental embeddings encode the relevant portions of the overall scene about the user, without requiring the video to capture the user's body parts. The environmental embeddings can be fused to determine meaningful (to body-pose estimation) relationships between different environmental embeddings, and the fused environmental embedding can be further fused with pose estimates from other sensors (e.g., a head-pose estimate inferred from a motion sensor) to further enhance body-pose predictions. For example, including head-pose estimation with environmental embeddings allows the head pose of the user to influence the generation of the pose estimation and select features in the environment that are correlated with the head pose, and therefore the body pose, to generate the user's estimated body-pose.

Figure 2:
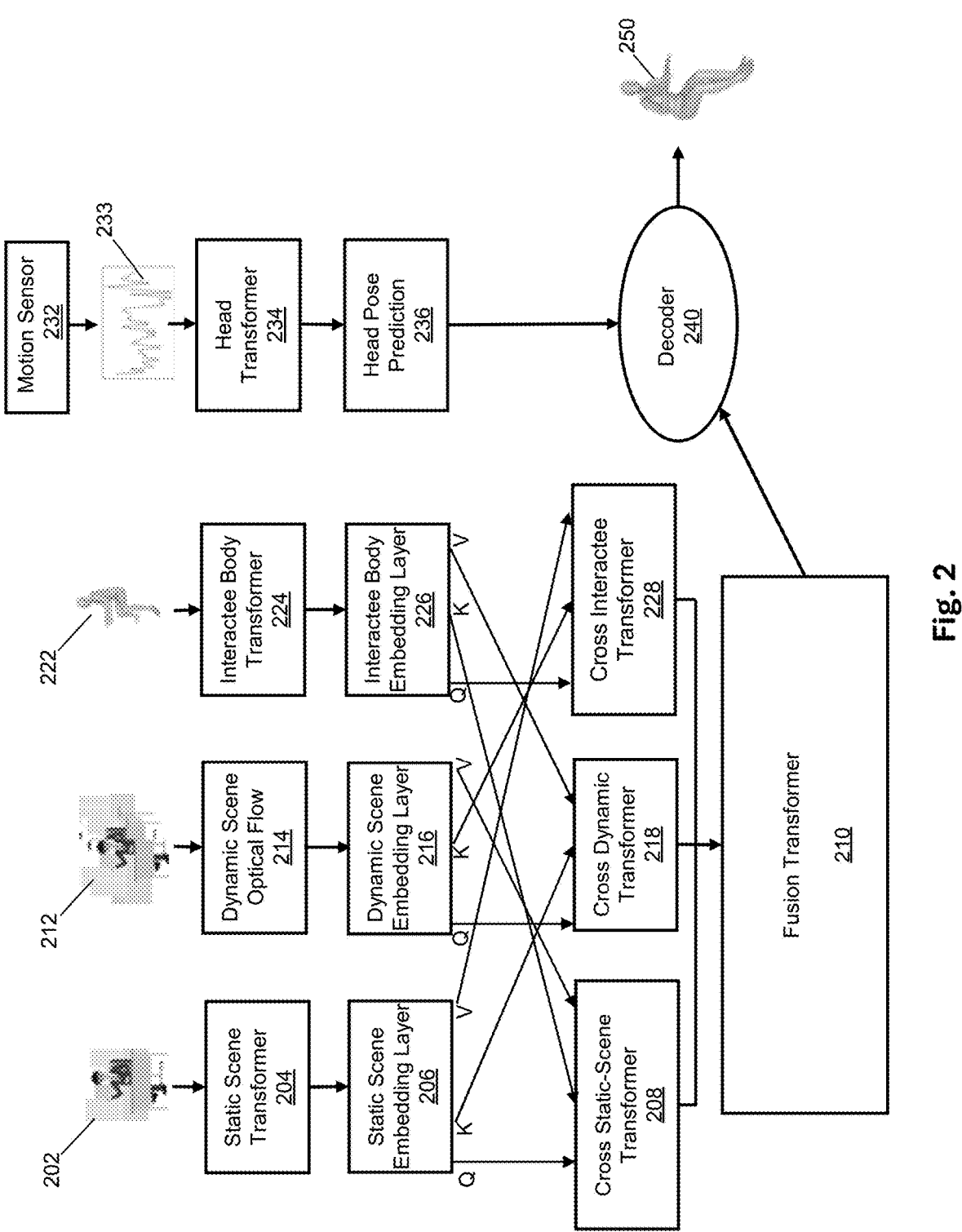
FIG. 2 illustrates an example architecture for estimating the body pose of a user.

As discussed above, multiple features maps and corresponding environmental embeddings are obtained to estimate a user's body pose. FIG. 2 illustrates a particular example architecture for estimating the body pose of a user. The example of FIG. 2 includes three types of environmental embeddings: (1) static scene, (2) dynamic scene, and (3) interactee, although this disclosure contemplates that N environmental feature maps and corresponding embeddings may be used in general, where N may be more or less than 3.

In the example of FIG. 2, an image frame 202 from a video captured by a head-mounted device is accessed. As explained below, image frame 202 may be a frame from a sequence of image frames in the captured video. Each image frame in a captured video represents a static image of the environment (real or virtual, or both) of the environment of the user wearing the HMD. The environment can include room layout, lighting, and objects like furniture and electronics, each of which provides context for a user's actions. For example, if a user is near a desk with a computer, one reasonable inference may be that the user is working. Similarly, a user in a kitchen surrounded by ingredients and utensils is likely cooking. The way objects are used and arranged provides information about what the user is doing and about the user's possible body poses.

To fully capture the static environment context of a user, for example by identifying objects in an image and the spatial relationships between objects, particular embodiments extract a static environmental feature map from a static image. The static-scene feature map may be an output of a convolutional layer representing specific features in an input image, or may more broadly be a set of features (e.g., a feature vector) identified from an input image. For example, a static-scene feature map may be determined by a deep-learning model that is pre-trained on an image dataset. More formally, for a static image $I_{Static}$, an example deep-learning model "Model( )," and an output static feature map $F_{Static}$, particular embodiments may process each image in a sequence of image in a captured video by $F_{Static}$=Model $(I_{Static})$.

For each image in an image sequence, the corresponding feature map is extracted. For instance, if a camera of an HMD is capturing video at a certain rate, e.g., 30 fps, then in each second 30 images are captured by that camera. A sequence may be any suitable length and need not be, e.g., 1 second. A sequence of n images around a given time t can be represented by $(I_{t1}, I_{t2}, \ldots, I_{tn})$.

In the example of FIG. 2, the feature map corresponding to each static image in a sequence is input to static scene transformer 204. Static-scene transformer 204 operates on each input feature map by static-scene transformer 204's Q, K, and V matrices to produce a sequence of static-scene embeddings at static scene embedding layer 206, which embeds the relevant static environmental information in each feature map. More formally, in the example of FIG. 2 an embedding $E_{Static}$ is obtained for each input image by $E_{Static}$=TransformerEncoder $(F_{Static})$.

In the example of FIG. 2, a transformer (i.e. static-scene transformer 204) is used to embed static-scene feature maps derived from static images 202. Transformers are also used for various other embeddings in the example of FIG. 2, as explained below. One reason that the transformer model is used in FIG. 2 is that a transformer can effectively model sequences and prioritize relevant features through its self-attention mechanism, by weighing the importance of different parts of input data and focusing on the most relevant features across the entire sequence of data.

In general, the transformer model is a type of neural network that relies on attention mechanisms to learn complex patterns and dependencies from sequence data. The transformer encoder takes in an input sequence and generates a continuous representation that captures the context and dependencies between the elements. The architecture of a transformer encoder includes N stacked blocks, each of which contains multi-head attention, layer normalization, feed forward neural network, and residual connections.

The multi-head attention applies self-attention multiple times at once, each with different key (K), query (Q), and value (V) matrix transformations of the input, and then combines the outputs. In other words, the K, Q, and V matrices of a transformer are model parameters learned during that transformer's training. The feed forward layer is a fully connected neural network that processes the output of the multi-head attention mechanism independently for each position in the sequence. For each of the sub-layers of the multi-head attention and feed forward neural network, layer normalization and residual connection are used. The layer normalization is used after each sub-layer to reduce uninformative variation in the activations to improve the stability and speed of the training process, while the residual connection is used around each sub-layer to allow the gradients to flow directly through the network to help mitigate the vanishing gradient problem. The architecture of the transformer model allows it to capture long-range dependencies and complex relationships within the input data and thus may be more suitable for processing multi-modality sensor data than other deep-learning models such as convolutional neural network (CNN) and recurrent neural networks (RNN), although in particular embodiments these deep-learning models may alternatively be used to extract features and/or embed extracted features.

In addition to static-scene embeddings, the example of FIG. 2 also embeds additional environmental information. For instance, dynamic-scene features provide information about motion and temporal changes among frames in a video sequence. Images 212 are a sequence of images from a video captured by an HMD camera. The example of FIG. 2 determines an optical flow 214 for sequences of images in the video, where optical flow is a pattern that quantifies the displacement of image pixels between consecutive frames, revealing the direction and magnitude of motion. Any suitable technique for computing optical flow, such as the Lucas-Kanade algorithm, can be used. Once the optical flow for a sequence of images is obtained, the homography (denoted as $H_{t_n}$) can be determined from the optical flow, and the homography can be used to estimate the HMD's pose relative to the environment. In addition, the dynamic scene features can be expressed as a sequence of homography within a specific time interval as follows. Let $H_{t_n}$=Homography $(I_{t_{n-1}}, I_{t_n})$. Then dynamic-scene feature $E_{t_n}$=Vectorize $(H_{t_{n-\alpha}}, H_{t_{n-\alpha+1}}, \ldots, H_{t_n})$, where $E_{t_n}$ is calculated from a sequence of homographies between successive frames within a specific time interval. The parameter a here represents the length of the frame sequence being considered. Then, the dynamic features over time $E_{Dynamic}$ are represented as $E_{Dynamic}$=$( \ldots, E_{t_{n-1}}, E_{t_n}, \ldots )$. $E_{Dynamic}$ includes information about how the camera moves and interacts with the environment, and can be considered as scene dynamic features or motion-based embeddings in dynamic scene embedding layer 216, and the dynamic features can serve as the embedding for subsequent input. As $E_{Dynamic}$ captures the changes over the previous $\alpha+1$ frames, it already addresses temporal sequence considerations and provides a continuous output embedding feature.

The example of FIG. 2 also embeds information about one or more interactees a user is interacting with. An HMD camera may capture images of (real or virtual) interactee(s), and an interactee's pose can be useful for estimating the user's pose because in human-human interactions, a person's actions may prompt a responsive action from the other. For example, if one person prepares to throw a ball, the other instinctively raises his/her arms to catch it. Such interaction appears in many scenarios, from simple conversations to collaborative tasks. In order to incorporate an interactee's body pose, the example of FIG. 2 first extracts features $B_{Interactee}$ 222 of the interactee in each frame of the video, using tools such as OpenPose. Features 222 may represent the 2D skeleton of the interactee. Features $B_{Interactee}$ are then encoded by an interactee body transformer 224, which encodes the interactee features to obtain embeddings $E_{Interactee}$=TransformerEncoder ($B_{Interactee}$) in interactee body embedding layer 226.

Step 130 of the example method of FIG. 1 includes fusing, by a plurality of trained environmental transformer models, the plurality of environmental embeddings to create a fused environmental embedding. For instance, in FIG. 2, static-scene embeddings, dynamic-scene embeddings, and interactee body embeddings are fused to better predict the user's body pose.

In the example of FIG. 2, cross-scene transformer 208, cross-dynamic transformer 218, and cross-interactee transformer 228 are each used to fuse the environmental embeddings described above. In this example, cross-attention is used to fuse the individual embeddings and determine the mutual influence of the various environmental embeddings, which is useful for developing a comprehensive 3D user model.

In CrossAttention (Q, K, V), the query (Q) represents elements seeking information retrieval from corresponding key-value pairs. The key matrix (K) calculates the relevance scores determining the importance of elements in relation to the queries, while the value matrix (V) contains the extracted information based on these computed attention scores. The dimensions of Q, K, V in the cross attention layer are n×$d_k$, m×$d_k$, and m×d, respectively, where m, n are the sequence length and $d_k$, $d_v$, are the embedding size. The CrossAttention (Q, K, V) can be calculated by softmax $$\left(\frac{QK^T}{\sqrt{d_k}}\right)V.$$

In the example of FIG. 2, since the environmental embeddings from $d_k$, the camera data (i.e., $E_{Static}$, $E_{Interactee}$, $E_{Dynamic}$) have the same sequence length and can be set to the same embedding size, they all can be represented by the same dimension n×d.

To fuse the environmental embeddings, FIG. 2 illustrates how a portion of each environmental embedding is fed into each cross-attention transformer. Each cross-attention transformer has specific weights, where $$W_S^Q, W_S^K,$$

and $$W_S^V$$

refer to the weights of cross static scene transformer 208, $$W_D^Q, W_D^K,$$

and $$W_D^V$$

refer to the weights of cross dynamic scene transformer 218, and $$W_I^Q, W_I^K,$$

and $$W_I^V$$

refer to the weights of cross interactee transformer 228.

The cross-attention layer of FIG. 2 operates on the environmental embedding layer to fuse those environmental embeddings. In the example of FIG. 2, the embedding output of static cross scene transformer 208 is:

$$E_{CrossStatic} = CrossAttention\left(E_{Static} W_S^Q, E_{Interactee} W_S^K, E_{Dynamic} W_S^V\right) \quad (1)$$

As a result, within the static scene embedding $E_{CrossStatic}$, cross-attention connects the user's actions and interactions with the environment.

The dynamic scene embedding encompasses the dynamic elements of the virtual environment, such as moving objects, dynamic lighting, and other time-dependent factors. Cross-attention in this context aids in linking the interactee's body movements and objects in the scene within the dynamic alterations. In the example of FIG. 2, the embedding output of cross dynamic transformer 218 is:

$$E_{CrossDynamic} = CrossAttention\left(E_{Dynamic} W_D^Q, E_{Static} W_D^K, E_{Interactee} W_D^V\right) \quad (2)$$

The interactee's embedding emphasizes the relevance of the interactee's body pose in relation to the user. Simultaneously, the dynamic scene embedding focuses on changing elements associated with body pose, highlighting temporal variations. Additionally, the static scene embedding represents stable elements within the scene. In the example of FIG. 2, the embedding output of cross interactee transformer 228 is:

$$E_{CrossInteractee} = CrossAttention\left(E_{Interactee} W_I^Q, E_{Dynamic} W_I^K, E_{Static} W_I^V\right) \quad (3)$$

The three environmental embeddings of the example of FIG. 2—interactee, static scene, and dynamic scene—are intrinsically linked, shaping the user's experience within the virtual environment. Cross-attention intertwines these embeddings, allowing exploration of complex relationships between the user's actions, their interactions, their focus on specific elements of the static scene, and their responses to dynamic environmental changes. By leveraging cross-attention across these embeddings, a 3D user model is created, accurately representing the user while encapsulating the contextual details of their interactions.

The fused representation, denoted as $E_{Fusion}$, results from fusion transformer 210 operating on the cross embeddings described above. In particular embodiments, the fused representation may be a concatenation of the cross embeddings, i.e.:

$$E_{Fusion} = (E_{CrossStatic}, E_{CrossInteractee}, E_{CrossDynamic}) \tag{4}$$

Other embodiments may fuse these cross embeddings via summation or via neural networks. It should be noted that this vector is not merely the concatenation of each of the static, dynamic, and interactee embeddings, as the embeddings in equation 4 are cross-embeddings determined by the cross-attention layer. As explained below, the fused embeddings are then used by decoder 240 to predict a user's body pose 250.

While the example of FIG. 2 encodes 3 visual inputs (i.e., static scene, dynamic scene, and extracted interactee) as the environment embeddings, this disclosure contemplates that in the addition or in the alternative other environmental features may be used, such as the surrounding environment represented as a point cloud. Such a point cloud can be obtained from depth images that can be captured by either a depth sensor or by multiple cameras on an HMD. Some transformer architectures designed for processing point cloud data, such as Point Cloud Transformer (PCT), may then be used as the transformer encoder. This transformer encoder encodes the input points into a new higher dimensional feature space that characterizes the semantic affinities between points.

More generally, to fuse N environmental embeddings (where N=3 in the example of FIG. 2), the cross-attention layer generates Q from one embedding and generates K, V from the stack of the rest N−1 embeddings. For example, assuming that the N environmental embeddings are $E_1$, $E_2, \ldots, E_N$, each of which is of dimension n×d, the i-th cross attention can be represented by CrossAttention $$(E_i W_i^Q, E_i' W_i^K, E_i' W_i^V),$$

where $$E_i' = (E_1^T, \ldots, E_{i-1}^T, E_{i+1}^T, \ldots, E_N^T)^T$$

is the stack of the embeddings other than $E_i$, and $$W_i^Q W_i^K W_i^V$$

are the model weights.

Step 140 of the example method of FIG. 1 includes determining a head pose of the user coincident with the accessed video. In other words, the determined head pose tracks the head pose of the user at the time the video was captured. The head pose may be determined by, for example, one or more sensors on the HMD. For instance, an HMD may include a motion sensor (e.g., an accelerometer, etc.) that records the motion of the HMD and therefore the motion of the user's head. The resulting motion data is represented as the X,Y,Z, position (in Cartesian coordinates) of the motion sensor in its own coordinate system, denoted as $M_{XYZ} = (\ldots, (x_{t_n}, y_{t_n}, z_{t_n})(x_{t_{n+1}}, y_{t_{n+1}}, z_{t_{n+1}}), \ldots)$. However, a direct translation of this sensor data to the user's head movement is not typically feasible because the motion sensor's coordinate system does not align with the coordinate system for constructing the user's full body.

To address this discrepancy, the example of FIG. 2 uses head transformer 234 to process the sensor data and generate a head-pose embedding for better understanding and interpretation of the input data. Specifically, motion sensor 232 obtains motion data 233 of the user's head. A feature vector is extracted from the data and fed into head transformer 234, which outputs head-pose embedding $E_{Head}$= Transformer-Encoder ($M_{XYZ}$), which is the head pose prediction 236. As explained below, this embedding $E_{Head}$ is Subsequently used as a prediction of the sequence of head parameters corresponding to the input timeline of motion sensor data, which is the representation of head movement in the coordinate system used for the full body. For example, in particular embodiments head parameters may be head SMPL (Skinned Multi-Person Linear model) parameters, where SMPL is a widely-used parametric model designed for the accurate and efficient estimation of 3D human body shapes and poses.

Step 150 of the example method of FIG. 1 includes predicting, by a trained decoder and based on the fused environmental embedding and the determined head pose of the user, a body pose of the user. In the example of FIG. 2, the output parameters (e.g., SMPL parameters) for body-pose prediction is obtained by:

$$h_{Head} = \text{softmax}(E_{Head}), \tag{5}$$

$$h = \sigma([E_{Fusion}, h_{Head}]W + b), \tag{6}$$

$$\text{Output}_{parameters} = \text{softmax}([E_{Fusion}, g \odot h_{Head}]) \tag{7}$$

where g is a learnable weight of $h_{Head}$, $\sigma( )$ represents an activation function, W represents a weight, b represents a bias, and $\odot$ represents a matrix product. By integrating head pose insights for detailed head dynamics to understand upper-body movements with diverse environmental embeddings, the fusion techniques described herein provide precise and context-aware 3D pose reconstructions based on sensor data and image data that does not directly identify the user's 3D body pose.

The following description provides an example of training the architecture of FIG. 2. The head-pose block (head transformer 234) is trained separately, using supervised learning and labelled ground-truth head-pose data. For instance, the loss function on ith training samples specifically for the head pose may be represented by:

$$L_{Head} = \frac{1}{N} \sum_{i=1}^{N} \left\| E_{Head}^{(i)} - GT_{Head}^{(i)} \right\|^2 \tag{8}$$

where $$GT^{(i)}_{Head}$$

is the ground-truth head-pose data in the ith frame, which may be determined by, for example, an external camera capturing head-pose information. The head transformer 234 is therefore trained to accurately output head pose embeddings from the sensed motion data.

To train the rest of the model, the trained head-pose transformer parameters are kept fixed, while the remaining model parameters are adjusted during supervised learning, using labelled ground-truth pose data. For instance, in the example of FIG. 2, the overall architecture is trained by freezing the parameters of trained head transformer 234 while updating the parameters of static scene transformer 204, dynamic scene optical flow 214, interactee body transformer 224, cross scene transformer 208, cross dynamic transformer 218, cross interactee transformer 228, and decoder 240. To do so, environmental training data and motion-sensor training data are input into the respective modalities, ultimately resulting in a 3D pose prediction 250 by the model. This prediction is compared to ground-truth pose data, using an objective function, and the model parameters are then updated, e.g., using backpropagation. For instance, in particular embodiments a primary component of the objective (loss) function is focused on the MSE (Mean Squared Error) loss of the final 3D body pose parameters. Particular embodiments may divide the loss analysis into upper and lower body sections, each having distinct hyperparameters contributing to their cumulative impact. The emphasis on the lower body is due to its reflection of the user's motion status and its supportive role in comprehending upper body movements, often warranting larger hyperparameters, while for the upper body, the focus is often primarily on the spine and elbow joints. For example, an MSE loss may be defined as:

$$L_{Upper} = \frac{1}{N}\sum\nolimits_{i=1}^{N}\left\|Parameters^{(i)}_{Upper} - GT^{(i)}_{Upper}\right\|^{2} \quad (9)$$

$$L_{Lower} = \frac{1}{N}\sum\nolimits_{i=1}^{N}\left\|Parameters^{(i)}_{Lower} - GT^{(i)}_{Lower}\right\|^{2} \quad (10)$$

where $$Parameters^{(i)}_{Upper},$$

$$Parameters^{(i)}_{Lower}$$

are 3D body-pose parameters (e.g., SMPL parameters) of upper and lower body of frame i, while $$GT^{(i)}_{Upper}, GT^{(i)}_{Lower}$$

are the ground truth of the respective body parameters. By employing different hyperparameters tailored to specific parts of the MSE loss, particular embodiments dynamically adjust the learning process to improve predictions for the upper and lower body In predicting human body pose, the pre-trained head pose prediction captures intricate head movements, while amalgamating features from the environmental modalities provides context for broader body actions. The parameters learned during training dictate how features and modalities are emphasized in environmental fusion, adapting to each source's importance. The techniques described herein capture details across different body regions, ultimately enhancing the accuracy of the full-body pose prediction.

Figure 3:
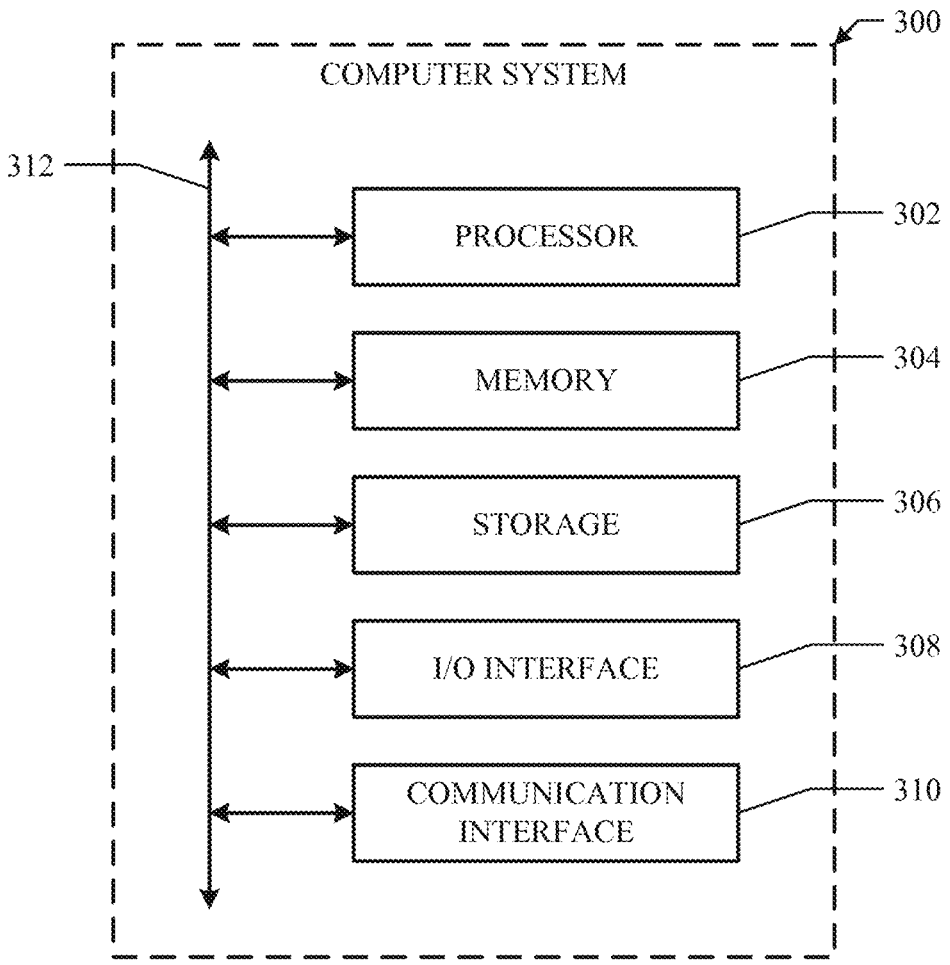
FIG. 3 illustrates an example computing system.

FIG. 3 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing egocentric video captured by one or more cameras of a head-mounted device (HMD) worn by a user;

determining, from the accessed video, a plurality of environmental feature maps and a corresponding plurality of environmental embeddings representing an environment of the user captured in the accessed video, wherein the plurality of environmental feature maps and the corresponding plurality of environmental embeddings comprise one or more of:

a static-scene feature map and corresponding static-scene embedding obtained from an image of the video;

a dynamic-scene feature map and corresponding dynamic-scene embedding representing changes among images in a sequence of images of the video; or an interactee feature map and corresponding interactee embedding obtained from an image of another user in the video;

fusing, by a plurality of trained environmental transformer models, the plurality of environmental embeddings to create a fused environmental embedding;

determining a head pose of the user coincident with the accessed video; and predicting, by a trained decoder and based on the fused environmental embedding and the determined head pose of the user, a body pose of the user from the egocentric video.

2. The method of claim 1, wherein the plurality of environmental feature maps and the corresponding plurality of environmental embeddings comprise:

a static-scene feature map and corresponding static-scene embedding obtained from an image of the video;

a dynamic-scene feature map and corresponding dynamic-scene embedding representing changes among images in a sequence of images of the video; and an interactee feature map and corresponding interactee embedding obtained from an image of another user in the video.

3. The method of claim 2, wherein fusing the plurality of environmental embeddings to create a fused environmental embedding comprises:

operating, by a cross static scene transformer, on each of the static-scene embedding, the dynamic-scene embedding, and the interactee embedding;

operating, by a cross dynamic transformer, on each of the static-scene embedding, the dynamic-scene embedding, and the interactee embedding; and operating, by a cross interactee transformer, on each of the static-scene embedding, the dynamic-scene embedding, and the interactee embedding.

4. The method of claim 3, wherein fusing the plurality of environmental embeddings to create a fused environmental embedding further comprises:

applying (1) a Q matrix of the cross static scene transformer to the static-scene embedding (2) a K matrix of the cross static scene transformer to either the dynamic-scene embedding or the interactee embedding and (3) a V matrix of the cross static scene transformer to the other of the dynamic-scene embedding or the interactee embedding;

applying (1) a Q matrix of the cross dynamic transformer to the dynamic-scene embedding (2) a K matrix of the cross dynamic transformer to either the static-scene embedding or the interactee embedding and (3) a V matrix of the cross dynamic transformer to the other of the static-scene embedding or the interactee embedding; and applying (1) a Q matrix of the cross interactee transformer to the interactee embedding (2) a K matrix of the cross interactee transformer to either the static-scene embedding or the dynamic-scene embedding and (3) a V matrix of the cross interactee transformer to the other of the static-scene embedding or the dynamic-scene embedding.

5. The method of claim 1, wherein determining a head pose of the user coincident with the accessed video comprises:

accessing motion data of a head of the user based on sensor data captured by a sensor in the HMD; and predicting, from the motion data of the head of the user, the head pose of the user.

6. The method of claim 5, wherein predicting the head pose of the user comprise determining, by a trained head-pose transformer, a head-pose embedding from the motion data.

7. The method of claim 6, wherein:

a plurality of head-pose transformer parameters are trained on pairs of training head-motion data and corresponding ground-truth head poses; and the plurality of head-pose transformer parameters are fixed while a plurality of transformer parameters of each of the environmental transformer models are trained on environmental training data and corresponding ground-truth body poses.

8. One or more non-transitory computer readable storage media storing instructions that are operable when executed to:

access egocentric video captured by one or more cameras of a head-mounted device (HMD) worn by a user;

determine, from the accessed video, a plurality of environmental feature maps and a corresponding plurality of environmental embeddings representing an environment of the user captured in the accessed video, wherein the plurality of environmental feature maps and the corresponding plurality of environmental embeddings comprise one or more of:

a static-scene feature map and corresponding static-scene embedding obtained from an image of the video;

a dynamic-scene feature map and corresponding dynamic-scene embedding representing changes among images in a sequence of images of the video; or an interactee feature map and corresponding interactee embedding obtained from an image of another user in the video;

fuse, by a plurality of trained environmental transformer models, the plurality of environmental embeddings to create a fused environmental embedding;

determine a head pose of the user coincident with the accessed video; and predict, by a trained decoder and based on the fused environmental embedding and the determined head pose of the user, a body pose of the user from the egocentric video.

9. The media of claim 8, wherein the plurality of environmental feature maps and the corresponding plurality of environmental embeddings comprise:

a static-scene feature map and corresponding static-scene embedding obtained from an image of the video;

a dynamic-scene feature map and corresponding dynamic-scene embedding representing changes among images in a sequence of images of the video; and an interactee feature map and corresponding interactee embedding obtained from an image of another user in the video.

10. The media of claim 9, wherein fusing the plurality of environmental embeddings to create a fused environmental embedding comprises:

operating, by a cross static scene transformer, on each of the static-scene embedding, the dynamic-scene embedding, and the interactee embedding;

operating, by a cross dynamic transformer, on each of the static-scene embedding, the dynamic-scene embedding, and the interactee embedding; and operating, by a cross interactee transformer, on each of the static-scene embedding, the dynamic-scene embedding, and the interactee embedding.

11. The media of claim 10, wherein fusing the plurality of environmental embeddings to create a fused environmental embedding further comprises:

applying (1) a Q matrix of the cross static scene transformer to the static-scene embedding (2) a K matrix of the cross static scene transformer to either the dynamic-scene embedding or the interactee embedding and (3) a V matrix of the cross static scene transformer to the other of the dynamic-scene embedding or the interactee embedding;

applying (1) a Q matrix of the cross dynamic transformer to the dynamic-scene embedding (2) a K matrix of the cross dynamic transformer to either the static-scene embedding or the interactee embedding and (3) a V matrix of the cross dynamic transformer to the other of the static-scene embedding or the interactee embedding; and applying (1) a Q matrix of the cross interactee transformer to the interactee embedding (2) a K matrix of the cross interactee transformer to either the static-scene embedding or the dynamic-scene embedding and (3) a V matrix of the cross interactee transformer to the other of the static-scene embedding or the dynamic-scene embedding.

12. The media of claim 8, wherein determining a head pose of the user coincident with the accessed video comprises:

accessing motion data of a head of the user based on sensor data captured by a sensor in the HMD; and predicting, from the motion data of the head of the user, the head pose of the user.

13. An apparatus comprising:

a head-mounted device (HMD) configured to be worn by a user and comprising one or more cameras configured to capture video of an environment of the user; and a computing device comprising one or more non-transitory computer readable storage media storing instructions; and one or more processors coupled to the one or more non-transitory computer readable storage media and operable to execute the instructions to:

access egocentric video captured by the one or more cameras of the (HMD);

determine, from the accessed video, a plurality of environmental feature maps and a corresponding plurality of environmental embeddings representing an environment of the user captured in the accessed video, wherein the plurality of environmental feature maps and the corresponding plurality of environmental embeddings comprise one or more of:

a static-scene feature map and corresponding static-scene embedding obtained from an image of the video;

a dynamic-scene feature map and corresponding dynamic-scene embedding representing changes among images in a sequence of images of the video; or an interactee feature map and corresponding interactee embedding obtained from an image of another user in the video;

fuse, by a plurality of trained environmental transformer models, the plurality of environmental embeddings to create a fused environmental embedding;

determine a head pose of the user coincident with the accessed video; and predict, by a trained decoder and based on the fused environmental embedding and the determined head pose of the user, a body pose of the user from the egocentric video.

14. The apparatus of claim 13, wherein the plurality of environmental feature maps and the corresponding plurality of environmental embeddings comprise:

a static-scene feature map and corresponding static-scene embedding obtained from an image of the video;

a dynamic-scene feature map and corresponding dynamic-scene embedding representing changes among images in a sequence of images of the video; and an interactee feature map and corresponding interactee embedding obtained from an image of another user in the video.

15. The apparatus of claim 14, wherein fusing the plurality of environmental embeddings to create a fused environmental embedding comprises:

operating, by a cross static scene transformer, on each of the static-scene embedding, the dynamic-scene embedding, and the interactee embedding;

operating, by a cross dynamic transformer, on each of the static-scene embedding, the dynamic-scene embedding, and the interactee embedding; and operating, by a cross interactee transformer, on each of the static-scene embedding, the dynamic-scene embedding, and the interactee embedding.

16. The apparatus of claim 15, wherein fusing the plurality of environmental embeddings to create a fused environmental embedding further comprises:

applying (1) a Q matrix of the cross static scene transformer to the static-scene embedding (2) a K matrix of the cross static scene transformer to either the dynamic-scene embedding or the interactee embedding and (3) a V matrix of the cross static scene transformer to the other of the dynamic-scene embedding or the interactee embedding;

applying (1) a Q matrix of the cross dynamic transformer to the dynamic-scene embedding (2) a K matrix of the cross dynamic transformer to either the static-scene embedding or the interactee embedding and (3) a V matrix of the cross dynamic transformer to the other of the static-scene embedding or the interactee embedding; and applying (1) a Q matrix of the cross interactee transformer to the interactee embedding (2) a K matrix of the cross interactee transformer to either the static-scene embedding or the dynamic-scene embedding and (3) a V matrix of the cross interactee transformer to the other of the static-scene embedding or the dynamic-scene embedding.

17. The apparatus of claim 13, wherein determining a head pose of the user coincident with the accessed video comprises:

accessing motion data of a head of the user based on sensor data captured by a sensor in the HMD; and predicting, from the motion data of the head of the user, the head pose of the user.

18. The apparatus of claim 17, wherein predicting the head pose of the user comprise determining, by a trained head-pose transformer, a head-pose embedding from the motion data.

19. The apparatus of claim 18, wherein:

a plurality of head-pose transformer parameters are trained on pairs of training head-motion data and corresponding ground-truth head poses; and the plurality of head-pose transformer parameters are fixed while a plurality of transformer parameters of each of the environmental transformer models are trained on environmental training data and corresponding ground-truth body poses.

20. The apparatus of claim 13, wherein the computing device comprises the HMD.

* * * * *